US005456161A

United States Patent [19]

Yuda et al.

[11] Patent Number: 5,456,161

[45] Date of Patent: Oct. 10, 1995

[54] COMPACT FLUID OPERATED CYLINDER AND METHOD

[75] Inventors: Lawrence F. Yuda, Seneca; Lawrence F. Yuda, Jr., West Union, both of S.C.

[73] Assignee: Compact Air Products, Inc., Westminster, S.C.

[21] Appl. No.: 218,827

[22] Filed: Mar. 29, 1994

Related U.S. Application Data

[63] Continuation-in-part of Ser. No. 106,691, Aug. 16, 1993, abandoned, which is a continuation of Ser. No. 886,291, May 21, 1992, abandoned.

[51] Int. Cl.[6] .............................. F01B 11/02; F16J 10/00; F16J 15/18

[52] U.S. Cl. ............................ 92/169.1; 92/164; 92/168; 277/167.5

[58] Field of Search .................................. 92/128, 169.1, 92/171.1, 164, 165 R, 168; 277/167.5; 29/888.06, 888.02

[56] References Cited

U.S. PATENT DOCUMENTS

| | | | |
|---|---|---|---|
| 3,136,230 | 6/1964 | Buckley | 92/128 |
| 3,343,460 | 9/1967 | Jones | 29/888.06 X |
| 3,439,399 | 4/1969 | Strang et al. | 29/888.06 X |
| 3,474,710 | 10/1969 | Stryker | 29/888.06 X |
| 3,717,070 | 2/1973 | Paul et al. | 92/169.1 X |
| 4,242,947 | 1/1981 | Renner et al. | 92/108 |
| 4,565,506 | 1/1986 | Williams | 92/128 X |
| 5,176,413 | 1/1993 | Westman | 277/167.5 X |

*Primary Examiner*—John E. Ryznic
*Attorney, Agent, or Firm*—Ralph Bailey

[57] ABSTRACT

A compact high pressure fluid operated cylinder and method for making same is illustrated wherein an end cap is held within the cylinder by a snap ring (E) carried within a groove at the end of the cylinder to prevent axial dislodgement outwardly from the end of the cylinder, while an O-ring (A) is carried within complementary grooves (B) and (C) within an intermediate circumferential portion of the end cap opposite the snap ring and an opposite cylinder wall portion respectively to prevent inward dislodgement of the end cap. By inserting the snap ring within the groove (D) while an inner surface of the end cap is in engagement with the O-ring so as to resiliently position the end cap in sealing engagement between the snap ring and the O-ring with the end cap in spaced relation to an adjacent end of the cylinder, a cushion seal is provided preventing chattering of the end cap during operation.

4 Claims, 2 Drawing Sheets

COMPACT FLUID OPERATED CYLINDER AND METHOD

This application is a continuation in part of application Ser. No. 08/106,691 filed Aug. 16, 1993, now abandoned, which is a continuation of application Ser. No. 07/886,291 filed May 21, 1992, now abandoned.

BACKGROUND OF THE INVENTION

This invention relates to a compact high pressure fluid operated cylinder and piston apparatus suitable for use, for example, for robotic grippers and the like, as illustrated in U.S. Pat. Nos. 4,566,727 and 4,492,400, together with a method of making and assembling same wherein the end caps are resiliently engaged between an O-ring adjacent an inner end and a snap ring adjacent an end of the cylinder to avoid leakage and chattering during operation.

The prior art contemplates utilizing a pair of spaced snap rings carried in grooves located on each side of an end cap for positioning same adjacent an end of a cylinder with an O-ring carried by a groove positioned wholly within the end cap intermediate the snap rings. Another prior art apparatus contemplates the use of a snap ring at the end of the cylinder on one side of the end cap while an inner portion of the end cap carries an O-ring and an intermediate shoulder is adapted to bear against a shoulder formed by a reduced bore within the cylinder. These devices require multiple steps in construction and do not lend themselves to compact construction in that the spaced snap rings, for example, require a cylinder of relatively substantial length. Moreover, the shoulder portions defined between the intermediate O-ring and the snap rings are reduced by the amount of the space occupied by the O-ring because the groove which accommodates the O-ring for sealing is of necessity relatively large since it is disposed entirely within the end cap and the shoulders are, therefore, more likely to fail in shear under high pressure within the cylinder.

Another disadvantage of the double snap ring construction resides in the fact that damage to the cylinder wall is likely to occur when inserting the inner snap ring and, because of the construction of the seal, leaking of the end cap is likely as a result of the positioning of the shoulders of the end cap between metallic snap rings opposite a damaged cylinder wall.

Accordingly, it is an important object of the invention to provide a structure for economical positioning of end caps within miniaturized cylinders wherein the end cap is positively positioned for reduced chattering with reduced length of cylinders.

Another important object of the invention is to provide an end cap structure for a cylinder and piston arrangement suitable for operation at a high pressure which may be economically constructed utilizing a snap ring on one side of the end cap on the outside thereof, while an O-ring is positioned within an intermediate groove or seat carried partially within the end cap and partially within an opposite portion of the cylinder wall.

Another important object of the invention is to provide a cylinder construction for use with high pressure apparatus which may be inexpensively constructed by lending itself to being severed in succeeded lengths from bar stock having an axial bore therein. The bar stock may be of any suitable length and may be round, square or otherwise multifaceted, depending upon the configuration desired for the cylinder.

Another important object of the invention is the provision of an end cap structure for a cylinder and piston arrangement suitable for operation without chattering of the end caps and without fluid leakage wherein the end cap is assembled so as to be resiliently squeezed or gripped between a resilient O-ring and a metallic snap ring.

SUMMARY OF THE INVENTION

It has been found that an economical end cap structure may be provided for a cylinder and piston arrangement lending itself to miniaturized construction for use at high pressure by utilizing a snap ring at the end of the cylinder on one side of the end cap, together with a seal including an O-ring intermediate the ends of the end cap with a groove formed partially within an intermediate portion of the piston and partially within a complementary opposed groove carried within the wall of the cylinder. Bar stock of the desired cross section has a bore which is "gun drilled" or pre-bored to form a suitable cylinder housing. The cylinder may be constructed from such gun grilled bar stock by sawing same into desirable lengths to form respective cylinders. By placing an inner groove within a location in the inner wall of the cylinders of shallow depth for cooperating with a complementary groove carried within the end cap such are together calculated to serve as a seat for sealing the O-ring, while at the same time affording a mechanical securement against inward displacement of the end piece.

Such a configuration permits spacing of the outer groove to accommodate a snap ring on the outer face of the end cap affording substantial shoulder portions for the end cap between the O-ring and the snap ring to avoid failure in shear as a result of high pressure obtaining within the cylinder.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

A miniaturized fluid operated cylinder assembly comprises a cylinder housing having cylindrical inner walls of uniform diameter extending from one end of the cylinder housing to the other. An end cap has an arcuate wall opposite, complementary to and within the cylindrical walls of the cylinder between respective and surfaces thereof. An O-ring sealing member A is carried intermediate said respective end surfaces of the end cap. A seat for carrying the O-ring sealing member is formed by complementary opposed grooves B and C carried respectively within the arcuate wall of the end member and the cylindrical inner walls of said cylinder housing. A groove D is carried within the cylindrical inner walls of the cylinder housing adjacent an outer end surface of the end cap, and a snap ring E is carried in the groove at an outer end surface of the end cap. Thus, the snap ring serves to prevent outward dislodgement of the end cap while the O-ring serves as a seal and to prevent inward dislodgement of the end cap with respect to the cylinder housing. The complementary opposed grooves B and C are of substantially equal size reducing the size of the seat portion required within the end cap and reducing length requirements of the end cap assembly.

The method of making the miniaturized fluid operated cylinder assembly contemplates severing the cylinder housings from bar stock containing an axial bore forming cylindrical inner walls of uniform diameter extending from one end of the cylinder housings to the other. By inserting an O-ring seal within a seat formed by an inner of the spaced grooves and a complementary groove within an intermediate portion of the end cap a seal is formed and the end cap is secured against dislodgement inwardly of the cylinder housing. Then inserting a snap ring within the other of said spaced grooves secures the end cap against outward dislodgement.

Figure 1:
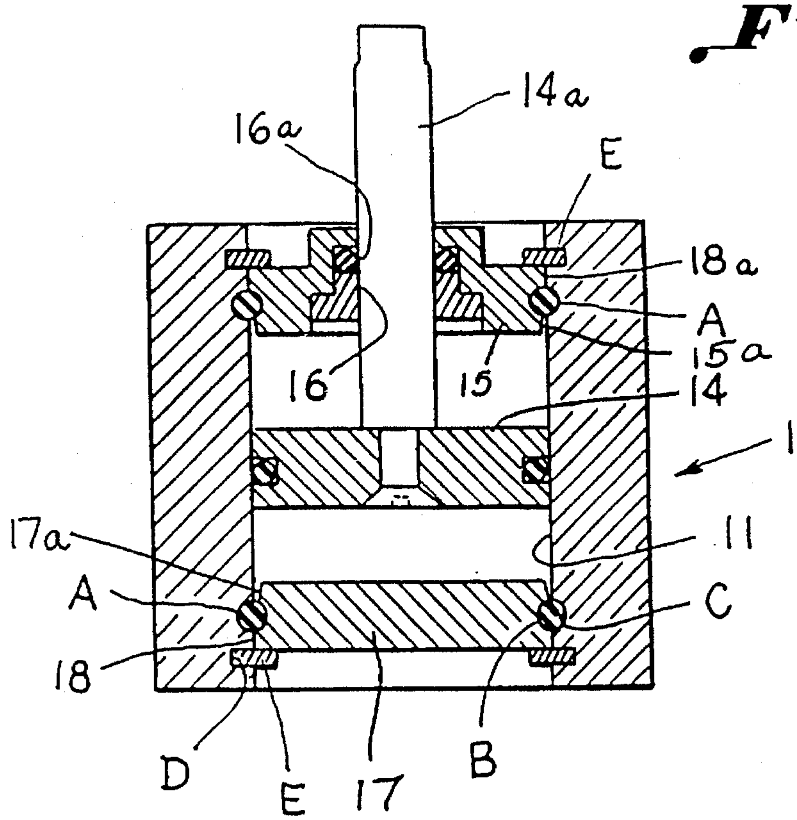
FIG. 1 is a longitudinal sectional elevation illustrating an end seal assembly constructed in accordance with the present invention.
Figure 3:
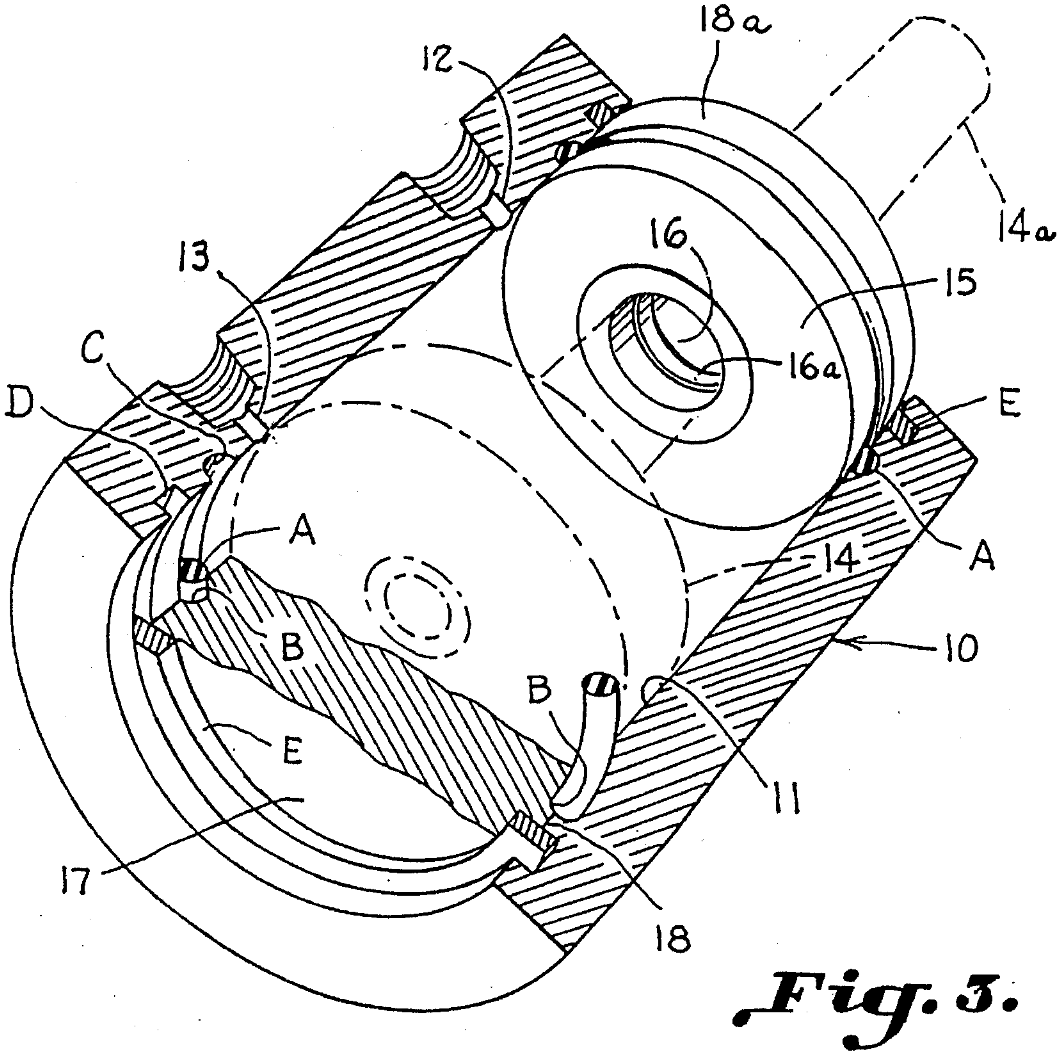
FIG. 3 is an enlarged perspective view, partially in section, which parts broken away illustrating a snap ring and an O-ring seal arrangement carried within the opposed wall portions of an end cap and cylinder with the end cap resiliently squeezed therebetween.

Referring more particularly to FIGS. 1 and 3, a cylinder housing is broadly designated at 10 having inner walls 11 of uniform diameter extending from one end of the cylinder housing to the other. The cylinder has fluid openings 12 and 13 which move a piston 14, illustrated in broken lines, back and forth within the cylinder walls 11 of the cylinder housing as shown in FIG. 3. An upper end cap is, constructed of rigid material, preferably metal, which is imperforate except for an opening for accommodating a piston shaft, is provided with an O-ring A and snap ring E in accordance with the invention. The opening 16 in the upper end cap 15 is provided for accommodating the piston rod 14*a* also illustrated in broken lines. The upper end cap has a tapering circumferential end wall 15*a* extending inwardly from the groove B to an inner end of the end cap. The opening 16 is provided with a suitable seal which includes an O-ring 16*a*.

The base of the cylinder assembly carries an end cap 17, constructed of rigid material and being imperforate, having an arcuate wall 18 complementary to and within the cylindrical walls 11 of the cylinder. The upper end cap has an arcuate wall 18*a*. A tapered circumferential end wall 17 extends inwardly from the groove to an inner end of the end cap.

The apparatus may be assembled by first positioning a resilient O-ring A within the respective innermost groove C at one end of the cylinder. Then the end cap starting with its respective tapered ends is pushed over the O-ring until the O-ring is seated between the groove in the cylinder and the complementary surface B of the respective end cap. Preferably, the metal snap ring E is then inserted in the respective outermost groove in the cylinder wall while exerting a force urging the end cap inwardly against the resilient force of the O-ring so that when the O-ring is in place within the groove the resilient force of the O-ring continues to act so that the O-ring and the snap ring both engage or squeeze the end cap which is thus wedged therebetween. By thus pre-loading the end cap weeping of air or oil around the end cap is avoided. It is important that the grooves C and D be so spaced as to accommodate such squeezing action with the end cap spaced inwardly of respective ends of the cylinder to accommodate the snap rings.

It may also be possible to position the O-ring between the tapered surface at the end of the end cap and the inner surface of the cylinder just beyond the groove when positioning the snap ring. Thereafter, fluid pressure may be applied causing the O-ring to firmly seat itself in the groove between the cylinder and the end cap so as to this pre-load the end cap resiliently mounting the end cap between the snap ring and the O-ring. This, the O-ring prevents inward dislodgement to the end cap while the snap ring resists the forces engendered during containment of high pressure tending to dislodge the end cap outwardly. By exerting resilient force by the O-ring urging the end cap against the snap ring, the end cap is maintained by resilient force between the O-ring and the snap ring.

Figure 2:
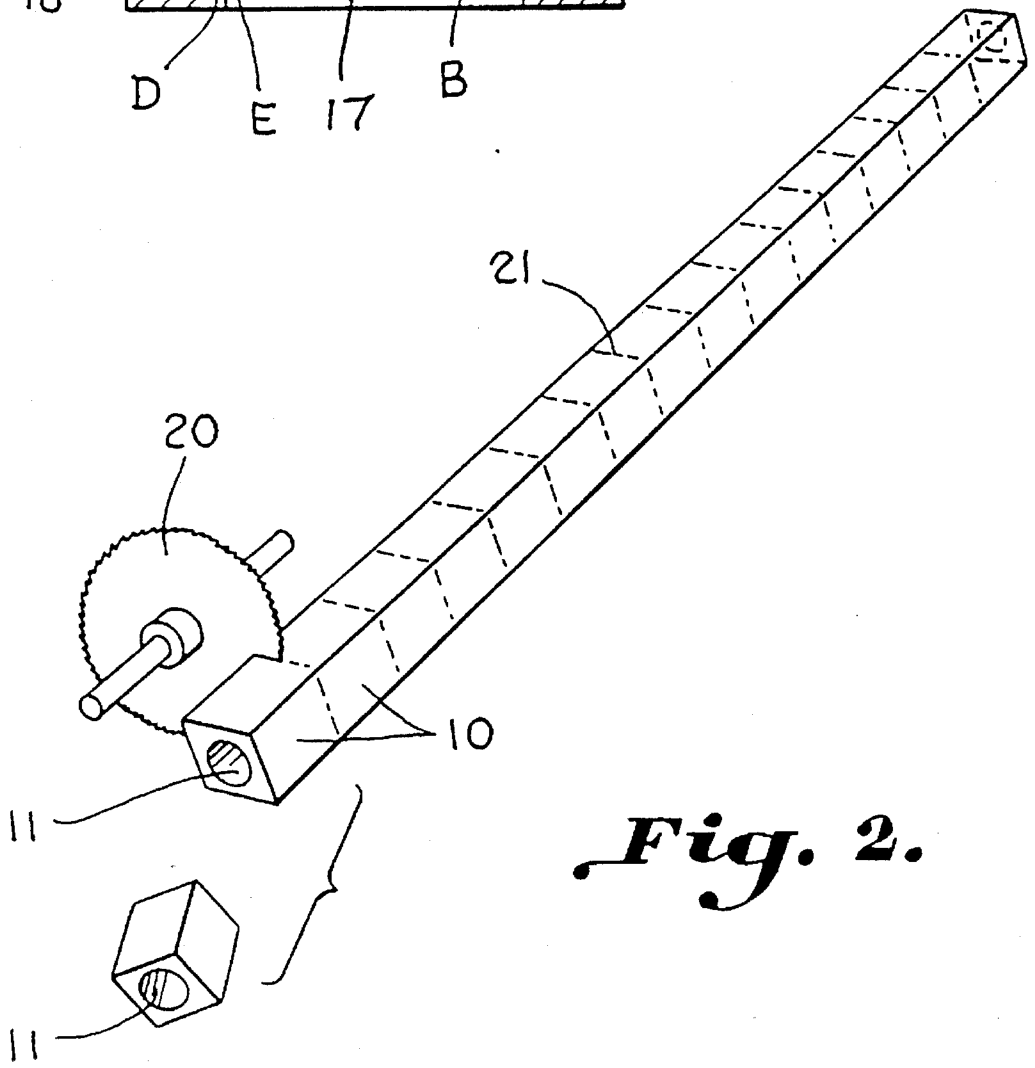
FIG. 2 is a perspective view illustrating bar stock from which a number of segments are being cut forming respective cylinders.

FIG. 2 shows the use of a heavy duty precision saw 10 for severing the bar stock 21 into a number of housings 10. The bore 11 forms the inner walls 11 for the respective cylinders.

Figure 4:
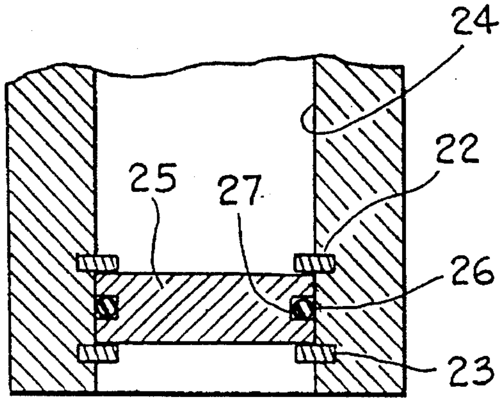
PRIOR ART Fig. 4.
FIG. 4 is a longitudinal sectional elevation illustrating a prior art construction utilizing a pair of spaced snap rings and an O-ring carried within a groove positioned entirely within an intermediate portion of the end cap.

FIG. 4 illustrates a cylinder having an end cap assembly constructed in accordance with the prior art where a pair of spaced snap rings 22 and 23 carried within complementary grooves within the cylinder wall 24 confine an end cap 25. The end cap 25 has an O-ring 26 intermediate its end carried within an enlarged groove 27 positioned wholly within the end cap 25.

Figure 5:
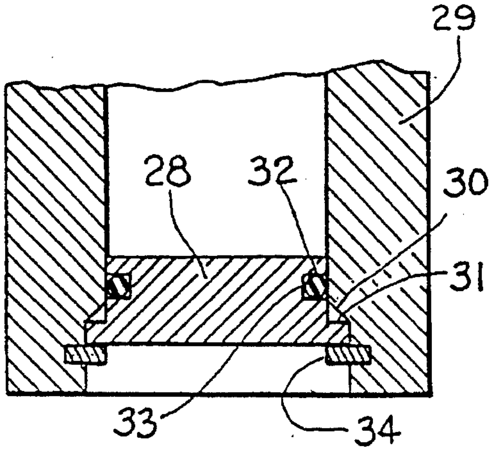
PRIOR ART Fig. 5.
FIG. 5 is a longitudinal sectional elevation illustrating a prior art construction wherein a snap ring is utilized at the end of the cylinder on one side of the end cap while a shoulder is formed by a reduced wall portion of the cylinder to receive an opposing shoulder on the end cap to avert inner dislodgement thereof, while a groove is carried adjacent an inner end of the end cap to accommodate an O-ring.

FIG. 5 illustrates another prior art construction wherein an end cap 28 is carried within cylinder housing 29 having internal walls which do not extend uniformly from end to end forming a shoulder at 30 opposite a shoulder 31 within the end cap for resisting inward movement of the end cap relative to the cylinder. An O-ring 32 is carried within a groove 33 carried at an inner portion entirely within the end cap 28. A snap ring 34 limits outward movement of the end cap. Such a construction is likely to permit rattling in view of the limited positive securement of the end cap between the shoulders 30 and 31 and the snap ring 34. Since the recess for the O-ring is formed by complementary grooves in opposed members, neither member is weakened by a single groove of substantial depth.

It is thus seen that a reduced number of parts and operation are required for construction of the cylinder assembly in accordance with the present invention. The O-ring serves its usual function as a seal and also serves to limit inner movement of the end cap with respect to the cylinder by resiliently wedging the end cap against a snap ring. The pressure within the cylinder assists the O-ring in performing this function. Because of such construction, chattering and noisy operation of the assembly during operation such as may result where a pair of spaced snap rings permit limited movement of the end cap therebetween is avoided.

While a preferred embodiment of the invention has been described using specific terms, such description is for illustrative purposes only, and it is to be understood that changes and variations may be made without departing from the spirit or scope of the following claims.

What is claimed is:

1. A miniaturized fluid operated cylinder assembly providing reduced end cap assembly length requirements prepared by a process comprising the steps of:

providing a cylinder housing containing an axial cylindrical inner wall of uniform diameter extending from one end of the cylinder housing to the other containing a piston therein;

providing a fluid inlet opening in said housing on a side of said piston for exerting a power stroke of said piston;

forming a pair of axially spaced grooves adjacent an end of said cylinder housing in said cylindrical inner wall;

providing an end cap for retaining fluid pressures within said cylindrical wall exerting a force tending to push said end cap outwardly many times greater than a force tending to push said end cap inwardly;

forming a complementary surface in said end cap opposite an innermost groove of said pair of axially spaced grooves spaced so that an outer edge of said end cap leaves the other of said grooves accessible when said complementary surface is opposite said innermost groove, said complementary surface tapering inwardly to an inner end of said end cap;

inserting an O-ring seal within a seat formed by said innermost groove and said complementary surface within an intermediate portion of said lower end cap forming a seal and securing said end cap against dislodgement inwardly of said cylinder housing;

inserting a snap ring within said other of said spaced grooves engaging an outer surface of said end cap, said complementary surface of said end cap being in engagement with said O-ring positioning said end cap between said O-ring and said snap ring so as to exert a resilient force on the end cap while securing said end cap in spaced relation to an adjacent end of said cylinder against outward dislodgement; and inserting said O-ring seal within said seat formed by said innermost groove and inserting said snap ring within the other of said spaced grooves so that the O-ring and the snap ring continue to squeeze the end cap therebetween thus pre-loading the end cap;

whereby said snap ring serves to prevent outward dislodgement of said end cap while said O-ring serves to provide a cushioned seal preventing chattering during operation and to prevent inward dislodgement of said end cap with respect to the cylinder housing.

2. The method of making a miniaturized fluid operated cylinder assembly providing reduced end cap assembly length requirements comprising the steps of:

providing a cylinder housing containing an axial cylindrical inner wall of uniform diameter extending from one end of the cylinder housing to the other containing a piston therein;

providing a fluid inlet opening in said housing on a side of said piston for exerting a power stroke of said piston;

forming a pair of axially spaced grooves adjacent an end of said cylinder housing in said cylindrical inner wall;

providing an end cap for retaining fluid pressures within said cylindrical wall exerting a force tending to push said end cap outwardly many times greater than a force tending to push said end cap inwardly;

forming a complementary groove in said end cap opposite an innermost groove of said pair of axially spaced grooves spaced so that an outer edge of said end cap leaves the other of said grooves accessibly when said complementary groove is opposite said innermost groove and an inwardly tapering circumferential surface extending from said complementary groove to an inner end of said end cap;

inserting a resilient O-ring seal within a seat formed by said innermost groove and said complementary groove within an intermediate portion of said end cap forming a seal and securing said end cap against dislodgement inwardly of said cylinder housing;

inserting a snap ring within said other of said spaced grooves engaging an outer surface of said end cap, an inner surface of said end cap being in engagement with said O-ring resiliently positioning said end cap in sealing engagement between said snap ring and said O-ring, and securing said end cap in spaced relation to an adjacent end of said cylinder against outward dislodgement; and inserting said O-ring seal within said seat formed by said innermost groove and inserting said snap ring within the other of said spaced grooves so that the O-ring and the snap ring continue to squeeze the end cap therebetween thus pre-loading the end cap;

whereby said snap ring serves to prevent outward dislodgement of said end cap while said O-ring serves as a cushioning seal preventing chattering during operation and to prevent inward dislodgement of said end cap with respect to the cylinder housing.

3. The method set forth in claim 2 wherein said snap ring is inserted within said other of said spaced grooves while exerting a force against said end cap urging same against a resilient force exerted by the O-ring while positioned in said seat.

4. A miniaturized fluid operated cylinder assembly providing reduced end cap assembly length requirements comprising:

a cylinder housing having a cylindrical inner wall of uniform diameter extending from one end of the cylinder housing to the other;

an end cap having an arcuate wall opposite, complementary to and within said cylindrical wall of said cylinder and contained entirely therein;

a resilient O-ring sealing member carried intermediate respective end surfaces of said end cap;

a seat for carrying said O-ring sealing member formed by complementary opposed grooves carried within said arcuate wall of the end member and said cylindrical inner wall of said cylinder housing;

an inwardly tapered circumferential surface extending from said groove in said end member to an inside end of said end member;

a source of high pressure fluid within said cylindrical wall for exerting a force urging said end cap outwardly of said cylinder;

a groove within said cylindrical inner wall of said cylinder housing adjacent an outer end surface of said end cap;

a snap ring carried in said groove at an outer end surface of said end cap; and said complementary opposed grooves accommodating said O-ring being spaced from said groove in said cylindrical wall so as to resiliently wedge the end member between the O-ring and the snap ring exerting a continuous resilient force pre-loading the end cap;

whereby said snap ring serves to prevent outward dislodgement of end cap while said O-ring serves as a seal and to prevent inward dislodgement of said end cap with respect to the cylinder housing.

* * * * *